(12) United States Patent
Tai et al.

(10) Patent No.: US 12,456,871 B2
(45) Date of Patent: Oct. 28, 2025

(54) PHOTOVOLTAIC COMPONENT CONTROL DEVICE

(71) Applicant: SUZHOU UKT NEW ENERGY TECHNOLOGY CO., LTD., Suzhou (CN)

(72) Inventors: Xiaojun Tai, Suzhou (CN); Yichi Zhang, Suzhou (CN); Huiming Cai, Suzhou (CN); Yang Lin, Suzhou (CN); Liang Zhou, Suzhou (CN); Youhua Huang, Suzhou (CN)

(73) Assignee: SUZHOU UKT NEW ENERGY TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/651,803

(22) Filed: May 1, 2024

(65) Prior Publication Data

US 2025/0079849 A1 Mar. 6, 2025

(30) Foreign Application Priority Data

Aug. 31, 2023 (CN) .......................... 202311111808.2

(51) Int. Cl.
*H02J 3/46* (2006.01)
*H02J 3/00* (2006.01)
(52) U.S. Cl.
CPC ................ *H02J 3/46* (2013.01); *H02J 3/007* (2020.01); *H02J 2300/24* (2020.01)
(58) Field of Classification Search
CPC ...... H02J 3/46; H02J 3/00; H02J 3/007; H02J 2300/24
See application file for complete search history.

(56) References Cited

U.S. PATENT DOCUMENTS

| 2018/0248359 | A1 | 8/2018 | Zou et al. |
| 2020/0067452 | A1* | 2/2020 | Yang ....................... H02J 3/388 |
| 2021/0249867 | A1* | 8/2021 | Har-Shai ............... H10F 77/955 |
| 2024/0014665 | A1* | 1/2024 | Ambrose .................. H02J 3/46 |

FOREIGN PATENT DOCUMENTS

| EP | 2 779 250 A2 | 9/2014 |
| JP | 2012-178535 A | 9/2012 |
| JP | 2013-252046 A | 12/2013 |

* cited by examiner

*Primary Examiner* — Robert L Deberadinis
(74) *Attorney, Agent, or Firm* — Birch, Stewart, Kolasch & Birch, LLP (57) ABSTRACT

The embodiment of the present disclosure provides a photovoltaic component control device including at least one bypass module configured to connect in parallel to at least one photovoltaic component; a driving circuit configured to drive the at least one bypass module to operate under control of a controller; a power supply module configured to obtain energy from the at least one photovoltaic component and output the energy to the controller in a case that the at least one photovoltaic component operates normally and the at least one photovoltaic component is bypassed; the controller configured to control an ON state of the at least one bypass module to control whether the at least one photovoltaic component is in a bypass mode. The energy consumption of the control device is greatly reduced, a problem of voltage stress is solved, and the safety performance of the bypass-type control device is improved.

10 Claims, 10 Drawing Sheets

PHOTOVOLTAIC COMPONENT CONTROL DEVICE

CROSS REFERENCE TO RELATED APPLICATIONS

This non-provisional application claims the benefit under 35 U.S.C. § 119(a) to patent application No. 202311111808.2, filed in China on Aug. 31, 2023, entitled "PHOTOVOLTAIC COMPONENT CONTROL DEVICE," which is hereby expressly incorporated by reference into the present application.

TECHNICAL FIELD

The present disclosure relates to the field of photovoltaic technology, and in particular, to a photovoltaic component control device.

BACKGROUND

Photovoltaic power generation technology has been one of the widely used clean energy technologies currently. The photovoltaic inverter grid-connected power system consists of a photovoltaic array and an inverter system. The photovoltaic array is composed of a plurality of photovoltaic components connected in series and provides sufficient and stable energy for the photovoltaic system. The photovoltaic component is the smallest indivisible photovoltaic cell combination device that is packaged and capable of providing direct current output individually. It is also referred to as a solar module or a solar panel. The photovoltaic component is composed of a plurality of cell units and reverse protection diodes connected to the cell units in parallel. A rapid control device is a common protection mechanism in the photovoltaic system.

A traditional control device is a series-type control device, that is, there are switch transistors connected in series in a voltage output circuit of the photovoltaic component. When the photovoltaic system generates power normally, the switch transistors are connected in series in a constant ON state to ensure the series connection of the modules and normal operation of the photovoltaic system. When a safety problem or safety failure occurs in the system, the switch transistors connected in series and photovoltaic arrays connected in series are disconnected, so that voltage at any interface of the array meets the safety rules, thereby protecting the safety of the inverter system.

The above-mentioned series-type control device has major defects. When the switch transistors connected in series are in a constant ON state, a large amount of energy consumption may be generated by the keeping-on switch transistors, resulting in low power generation efficiency.

SUMMARY

In view of the above, embodiments of the present disclosure provide a photovoltaic component control device to solve at least one of the problems existed in the background.

In the first aspect, an embodiment of the present disclosure provides a photovoltaic component control device, including at least one bypass module, a driving circuit, a power supply module, and a controller. The at least one bypass module is configured to connect in parallel to at least one photovoltaic component. The power supply module is configured to connect to the at least one photovoltaic component and the at least one bypass module.

The at least one bypass module is configured to bypass the at least one photovoltaic component under control of the controller.

The driving circuit is configured to drive the at least one bypass module to operate under the control of the controller.

When the at least one photovoltaic component operates normally and the at least one photovoltaic component is bypassed, the power supply module is configured to obtain energy from the at least one photovoltaic component and output the energy to the controller.

The controller is configured to control an ON state of the at least one bypass module to control whether the at least one photovoltaic component is in a bypass mode.

In combination with the first aspect of the present disclosure, in one optional embodiment, the at least one bypass module may include a power switch device. An input end and an output end of the power switch device may be respectively connected to a positive electrode and a negative electrode of the at least one photovoltaic component. A control end of the power switch device may be configured to receive a driving signal of the driving circuit.

In combination with the first aspect of the present disclosure, in one optional embodiment, the at least one bypass module may include a reverse current protection unit connected in series to the power switch device and configured to prevent the power switch device from being damaged by reverse current.

In combination with the first aspect of the present disclosure, in one optional embodiment, the at least one bypass module may include a voltage drop adjustment unit configured to adjust a voltage drop between an input end and an output end of the at least one bypass module to a predetermined value in a case that the power switch device is in an operation state.

In combination with the first aspect of the present disclosure, in one optional embodiment, the at least one bypass module may include at least one diode, and the at least one diode may be connected in series to the power switch device.

In combination with the first aspect of the present disclosure, in one optional embodiment, the power supply module may include a buck circuit configured to convert a voltage output by the at least one photovoltaic component to a second operating voltage in a case that the at least one photovoltaic component operates normally.

In combination with the first aspect of the present disclosure, in one optional embodiment, the power supply module may include a boost circuit configured to convert a voltage between the input end and the output end of the at least one bypass module to a first operating voltage in a case that the at least one photovoltaic component is bypassed.

In combination with the first aspect of the present disclosure, in one optional embodiment, the power supply module may include a switching circuit configured to compare the second operating voltage with a reference voltage, and control whether the boost circuit and the at least one bypass module may be turned on or off according to the comparison result.

In combination with the first aspect of the present disclosure, in one optional embodiment, the switching circuit may include a comparator and at least one switch transistor, a first signal input end of the comparator may be configured to receive the second operating voltage output by the buck circuit, and a second signal input end of the comparator may be configured to receive a reference signal, an input end and an output end of the at least one switch transistor may be connected to the boost circuit and the bypass module, and a control end of the at least one switch transistor may be connected to a signal output end of the comparator.

In combination with the first aspect of the present disclosure, in one optional embodiment, the at least one bypass module may include two or more bypass modules connected in series, and the two or more bypass modules connected in series may be configured to connect in parallel to the at least one photovoltaic component.

In combination with the first aspect of the present disclosure, in one optional embodiment, the controller may include a communication module, a voltage detection circuit, and/or a temperature detection circuit.

The communication module may be configured to receive a control signal and transmit the control signal to the controller.

The voltage detection circuit may be configured to obtain the voltage output by the at least one photovoltaic component.

The temperature detection circuit may be configured to obtain temperature of the at least one photovoltaic component.

According to a photovoltaic component control device provided by an embodiment of the present disclosure, by directly connecting the bypass module to the photovoltaic component in parallel, the photovoltaic component can be in a bypass mode in the case that it does not need to output normal operating voltage or operating power, and no switch devices are connected in series between the photovoltaic component and the bypass module, thus completely avoiding the energy consumption caused by the constant ON of a series-type switch transistor in a conventional series-type turn-off device, which will reduce the power consumption of the control device and improve the output power of the photovoltaic array. Another problem of voltage stress on a first series-connected switch transistor in the series-type turn-off device when it is disconnected is solved, and the safety performance is improved. The elimination of the series-type switch transistor may simplify the circuit structure of the control device, reduce the complex turn-off logic and timing control requirement, improve the reliability of the control device, and reduce the cost. By directly connecting the bypass module and the photovoltaic component in parallel, a failure component can be removed independently without affecting the normal operation of a component system, thereby turning off a single module.

Additional aspects and advantages of the present disclosure will be set forth in part in the description that follows, and in part will be obvious from the following description, or may be learned by practice of the present disclosure.

BRIEF DESCRIPTION OF DRAWINGS

The accompanying drawings are described to provide a further understanding of the present disclosure and constitute a part of the present disclosure. The illustrative embodiments and the descriptions thereof in the present disclosure are used to explain the present disclosure and do not constitute an undue limitation of the present disclosure. In the drawings.

DETAILED DESCRIPTION

To make the technical solutions and beneficial effects of the present disclosure more obvious and understandable, the technical solutions of the present disclosure will be clearly and completely described below with reference to the embodiments by enumerating specific embodiments. Obviously, the described embodiments are only a part not all of the embodiments of the present disclosure. According to the embodiments of the present disclosure, all other embodiments obtained by those skilled in the art without making creative work will fall within the protection scope of the present disclosure.

Unless defined otherwise, technical or scientific terms used herein should have general meanings understood by those skilled in the art to which the present disclosure belongs. The terms used in the description of the present disclosure are only for the purpose of describing specific embodiments and are not intended to limit the present disclosure.

It can be understood that the terms "first", "second", etc. used in the present disclosure are used herein to describe various elements, but these elements are not limited by these terms. These terms are only used to distinguish one element from another. For example, a first resistor may be referred to as a second resistor, and similarly, a second resistor may be referred to as a first resistor, without departing from the scope of the present disclosure. The first resistor and the second resistor are both resistors, but they may be not the same resistor. When a "first" element, component, module, region, layer, or part is described, it does not mean that there must be a "second" one. When a "second" element, component, module, region, layer, or part is discussed, it does not mean that there must be a first one in the present disclosure. As used herein, the singular forms "a", "an", and "the" may be intended to include the plural forms as well, unless the context clearly indicates otherwise. "A plurality of" means more than two, unless clearly and specifically defined otherwise. It will also be understood that the term "comprise/include", when used in this specification, specifies the presence of the features, but does not preclude the presence or addition of one or more other features. As used herein, the term "and/or" includes any and all combinations of the associated listed items.

It can be understood that "connection" in the context of the present disclosure means transmission of an electrical signal or data between one connected end and another end connected to the one connected end, which can be understood as "electrical connection", "communication connection", etc. In the context of the present disclosure, "A is directly connected to B" means that there are no other elements other than a wire between A and B.

Figure 1:
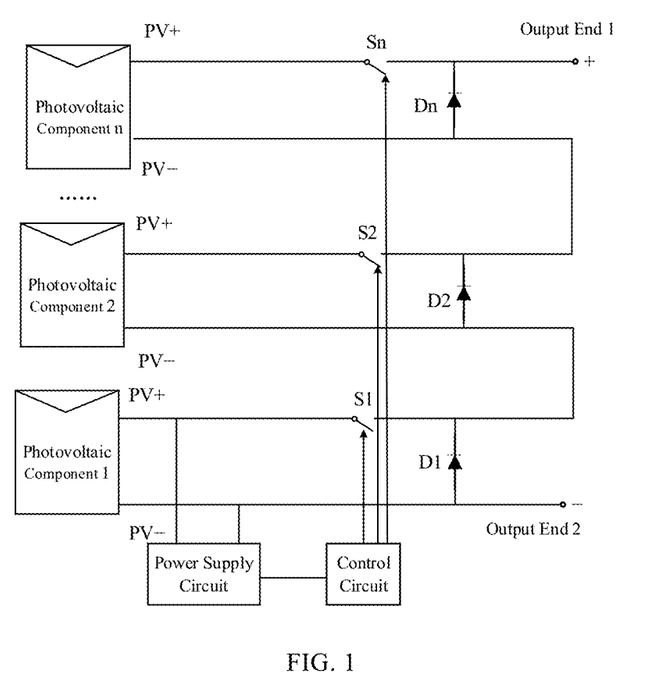
FIG. 1 is a schematic diagram illustrating a related technology of a series-type turn-off device.

FIG. 1 illustrates a related technology of a series-type turn-off photovoltaic control device. A photovoltaic array may include n photovoltaic components connected in series. The photovoltaic array may output power through a positive voltage output end 1 and a negative voltage output end 2. A switch may be connected in series to a voltage output circuit of each photovoltaic component, and a switch may be connected in parallel to a voltage output end of each photovoltaic component. A switch S1 may be connected in series to a voltage output circuit of a photovoltaic component 1, and a voltage output end of the photovoltaic component 1 after being connected in series to the switch may be connected in parallel to an anti-reverse diode D1. A switch S2 may be connected in series to a voltage output circuit of a photovoltaic component 2, and a voltage output end of the photovoltaic component 2 after being connected in series to the switch S2 may be connected in parallel to an anti-reverse diode D2. A switch Sn may be connected in series to a voltage output circuit of a photovoltaic component n, and a voltage output end of the photovoltaic component n after being connected in series to the switch Sn may be connected in parallel to an anti-reverse diode Dn. The voltage output circuit of the photovoltaic component 1 may be connected to a power supply circuit which is configured to supply energy to a control circuit so that the control circuit can operate continually.

When a failure or a safety hazard of a photovoltaic component is detected, the switch connected in series to the photovoltaic component may be disconnected, for example, the switch S1 is disconnected, the output of the photovoltaic component may be turned off, and current output by other photovoltaic components will flow through D1.

The inventor found that the above-mentioned series-type control device may have the following defects. Firstly, when the photovoltaic component operates normally, the series-type switch transistors may be in a constant turn-on state, and the ON switch transistors may consume a large amount of energy. Secondly, the series-type control device has high requirements on an OFF logic and timing control, the complexity of the control system causes high cost of the control device. Thirdly, when a first switch transistor in the control device is disconnected, the first switch transistor must withstand high voltage stress of a photovoltaic component system, and a risk of overvoltage breakdown exists.

Fourthly, when the photovoltaic components are in different operation states of a normal operation state and an OFF state as mentioned above, how to design a stable and reliable power supply circuit is also an important problem which has been trying to be addressed in this field.

Figure 2:
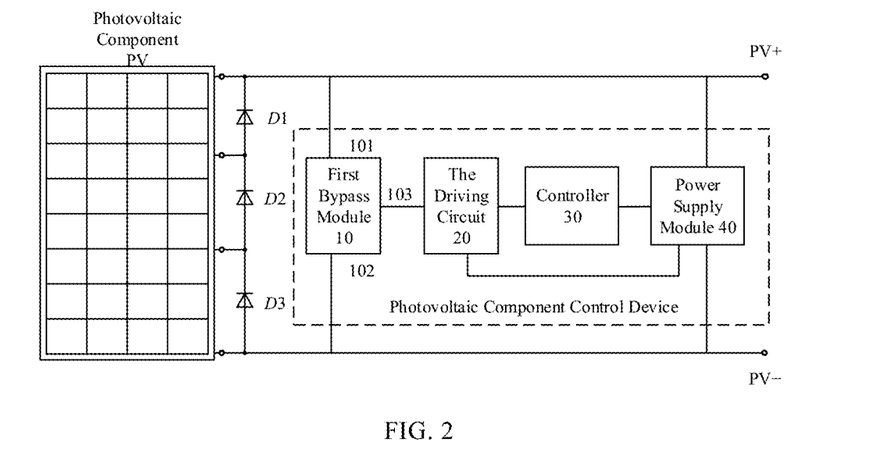
FIG. 2 is a first schematic diagram illustrating a photovoltaic component control device provided in an embodiment of the present disclosure.

Thus, an embodiment of the present disclosure provides a photovoltaic component control device including at least one first bypass module 10, a driving circuit 20, a power supply module 40, and a controller 30. The at least one bypass module is configured to connect in parallel to at least one photovoltaic component and bypass the at least one photovoltaic component under the control of the controller 30. In the case that the at least one photovoltaic component is bypassed, the at least one photovoltaic component may be in a bypass mode. The at least one bypass module may be one bypass module or more than two bypass modules. The at least one photovoltaic component may be one photovoltaic component or more than two photovoltaic components. "The at least one bypass module may be configured to connect in parallel to at least one photovoltaic component" may include "one bypass module may be configured to connect in parallel to one photovoltaic component", "one bypass module may be configured to connect in parallel to two or more photovoltaic components", or "two or more bypass module may be connected in series with each other, then connected in parallel to one or two or more photovoltaic components".

FIG. 2 illustrates an embodiment in which a first bypass module 10 is connected in parallel to a photovoltaic component. The photovoltaic component may include several cell units, and each cell unit may be connected in reverse parallel to a diode. As shown in FIG. 2, D1, D2, and D3 are diodes connected in reverse parallel to the photovoltaic cell units inside the photovoltaic component PV to form a unidirectional channel for a power supply of the component.

The first bypass module 10 may be configured to connect in parallel to a photovoltaic component PV1. That is, a voltage input end 101 and a voltage output end 102 of the first bypass module 10 may be respectively connected to a positive electrode and a negative electrode of PV1. A switch device may be not included between the voltage input end 101 and the positive electrode of the at least one photovoltaic component PV1 and between the voltage output end 102 and the negative electrode of PV1. A control end 103 of the first bypass module 10 may be connected to a driving circuit 20 and configured to receive a driving signal output by the driving circuit 20. The first bypass module 10 may include a power switch device. Optionally, the power switch device may include a relay, a thyristor, a MOSFET, an IGBT, or the like.

A power supply module 40 may be configured to connected to the at least one photovoltaic component PV1 and the at least one bypass module 10, to obtain energy from the at least one photovoltaic component PV1 and output the energy to the controller 30 and the driving circuit 20 in the case that the at least one photovoltaic component PV1 operates normally and the at least one photovoltaic component PV1 is bypassed. The power supply module 40 can obtain the energy in the two operation states of the normal operation mode and the bypass mode of the photovoltaic component, and supply the energy to the controller 30 and the driving circuit 20, so that they can operate continually.

The driving circuit 20 receives a control signal from the controller 30 and outputs a driving voltage to the at least one bypass module 10, which will drive the at least one bypass module 10 to operate under the control of the controller 30.

The driving circuit 20 may also obtain operating voltage from the power supply module 40.

The controller 30 is configured to control the ON state of the at least one bypass module 10 to control whether the at least one photovoltaic component is in the bypass mode. When the at least one photovoltaic component PV1 needs to be bypassed, the controller 30 may output the control signal to the driving circuit 20, and the driving circuit 20 may further drive the first bypass module 10 to turn on to bypass the at least one photovoltaic component PV1 so that the at least one photovoltaic component PV1 is in the bypass mode and stop outputting power to outside. An occasion that the at least one photovoltaic component PV1 needs to be bypassed may include the failure of a power system or a safety incident, such as direct current arcing of the photovoltaic component, the failure of a photovoltaic component, fire, etc.

Figure 3A:
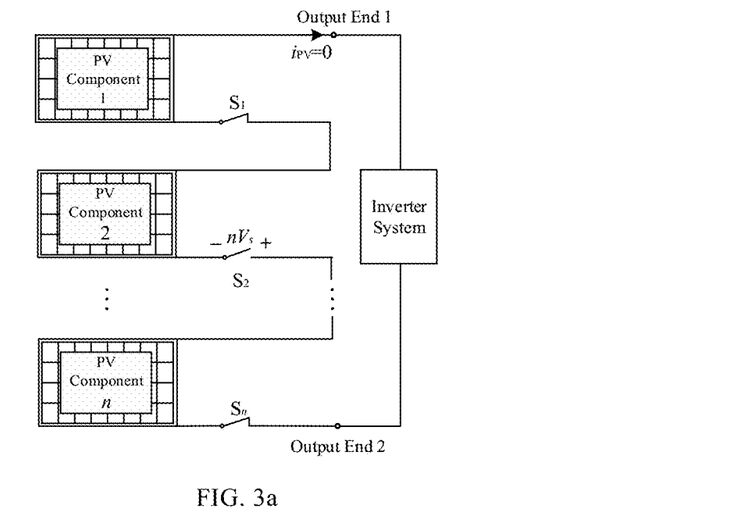
FIG. 3a is a schematic diagram illustrating a photovoltaic component turned off by a series-type turn-off device.

When a traditional series-type turn-off device is used to turn off the photovoltaic component, a discharge circuit of the photovoltaic component may be disconnected, and output current thereof is zero, that is, no current is output. The photovoltaic component in the bypass mode may be still in the operation state, form a discharge circuit with the bypass module 1, but the voltage output by it may be very small. The output voltage may depend on the voltage drop of turning on the bypass module. An OFF state and the bypass mode are compared and described in the following. FIG. 3a is a schematic diagram illustrating a state when a photovoltaic component is turned off by a traditional series-type turn-off device. When a single photovoltaic (PV) module 2 is disconnected for protection in the photovoltaic array, the discharge circuit of the photovoltaic component is disconnected, current output by the photovoltaic array is $i_{PV}=0$, the photovoltaic array does not operate at this time, the voltage of the series-connected module withstand by a switch $S_2$ is $nV_s$, where, $V_s$ represents an output voltage when the photovoltaic component is disconnected.

Figure 3B:
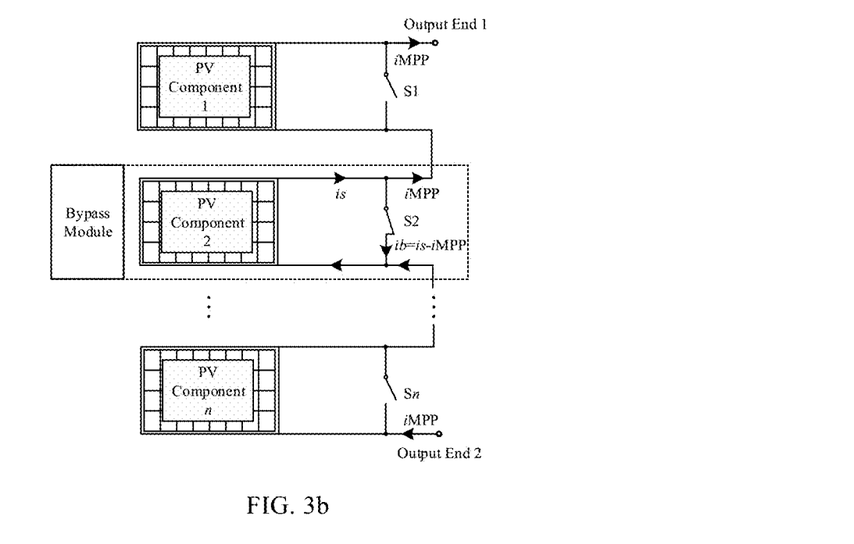
FIG. 3b is a schematic diagram illustrating a bypass mode of a single component according to an embodiment of the present disclosure.
Figure 3C:
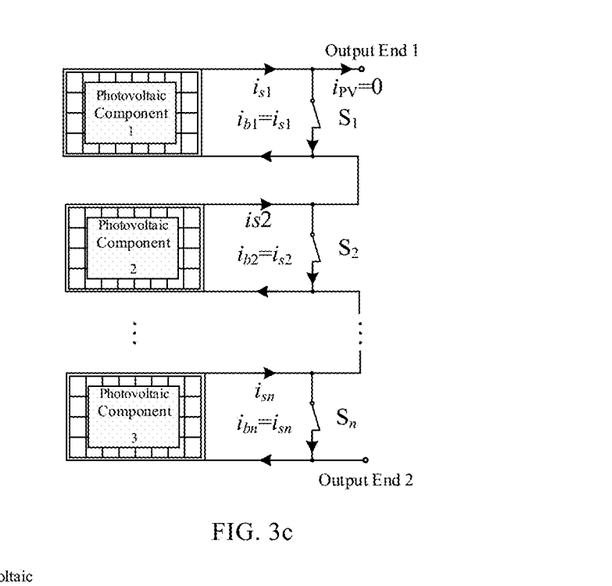
FIG. 3c is a schematic diagram illustrating a bypass mode of whole components according to an embodiment of the present disclosure.

FIG. 3b is a schematic diagram illustrating a bypass mode of a single component according to an embodiment of the present disclosure, in which the bypass module may be equivalent to a switch. When a certain photovoltaic component of a photovoltaic array needs bypass protection, for example, single component bypass protection may be performed on the photovoltaic (PV) component 2, a switch S2 may be closed, the bypass module may be turned on, and the current flows through the bypass switch S2 may be represented by $i_b=i_s-i_{MPP}$, where, is represents short-circuit current of the photovoltaic (PV) component 2, and $i_{MPP}$ represents normal operation current (an MPPT maximum power point) of the photovoltaic array of the remaining series-connected photovoltaic components. FIG. 3c is a schematic diagram illustrating a bypass mode of whole components according to an embodiment of the present disclosure, in which the bypass module may be equivalent to a switch. When a component of a photovoltaic array needs bypass protection, after the whole components are bypassed, switches $S_1 \sim S_n$ may be closed and the bypass module may be turned on. At this time, current on a bypass switch may be $i_b=i_s$, and $i_{PV}=0$, where, $i_{PV}$ represents output current of the photovoltaic array, and the photovoltaic array has no voltage and current output.

In a possible implementation, at least one bypass module may include n bypass modules including a first bypass module 10, a second bypass module 20, . . . , and an $n^{th}$ bypass module n10. At least one photovoltaic component may include n photovoltaic components including a first photovoltaic component PV1, a second photovoltaic component PV2, . . . , an $n^{th}$ photovoltaic component PVn, where, n represents a natural number greater than one. Optionally, each bypass module may be driven by a corresponding driving circuit, or different bypass modules may be driven by a same driving circuit. When the at least one photovoltaic component includes two or more photovoltaic components, the two or more photovoltaic components can be connected in series or parallel.

Figure 4:
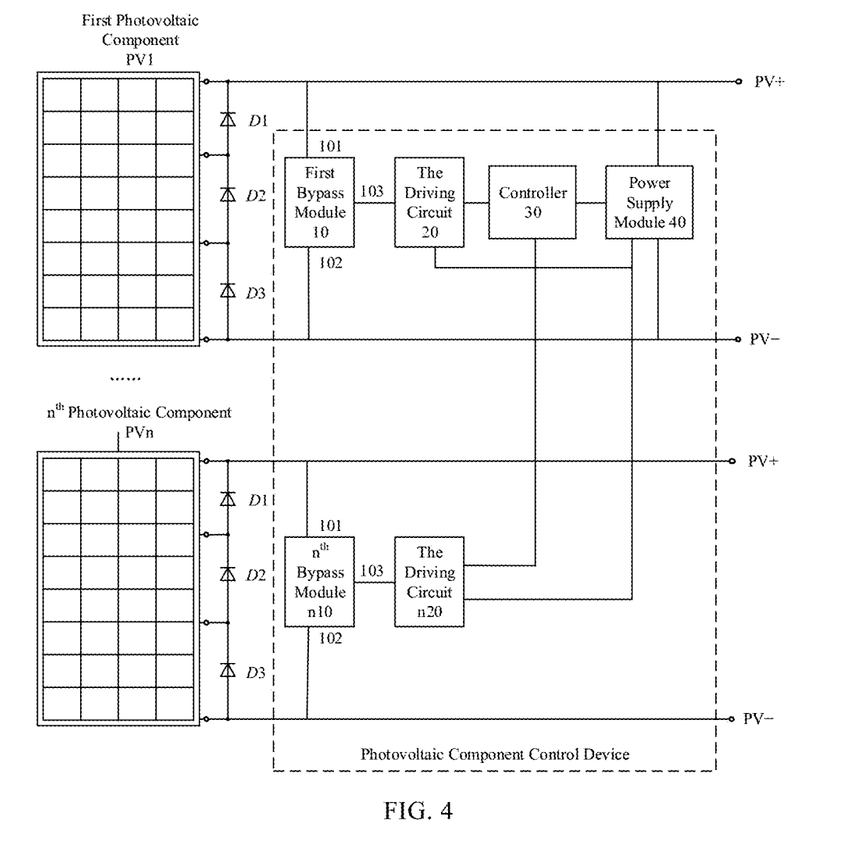
FIG. 4 is a second schematic diagram illustrating a photovoltaic component control device provided in an embodiment of the present disclosure.

Optionally, each bypass module may be connected in parallel to a photovoltaic component, so that a failure component can be independently removed without affecting the normal operation of other components, thereby achieving rapidly turning off a single component. Referring to FIG. 4, a first bypass module 10 may be connected in parallel to a first photovoltaic component PV1, and an $n^{th}$ bypass module n10 may be connected in parallel to an $n^{th}$ photovoltaic component PVn. The $n^{th}$ bypass module n10 may be driven by a driving circuit n20. The controller 30 can control whether a plurality of bypass modules are turned on or off at the same time, thereby realizing rapidly turning off a single component.

Figure 5A:
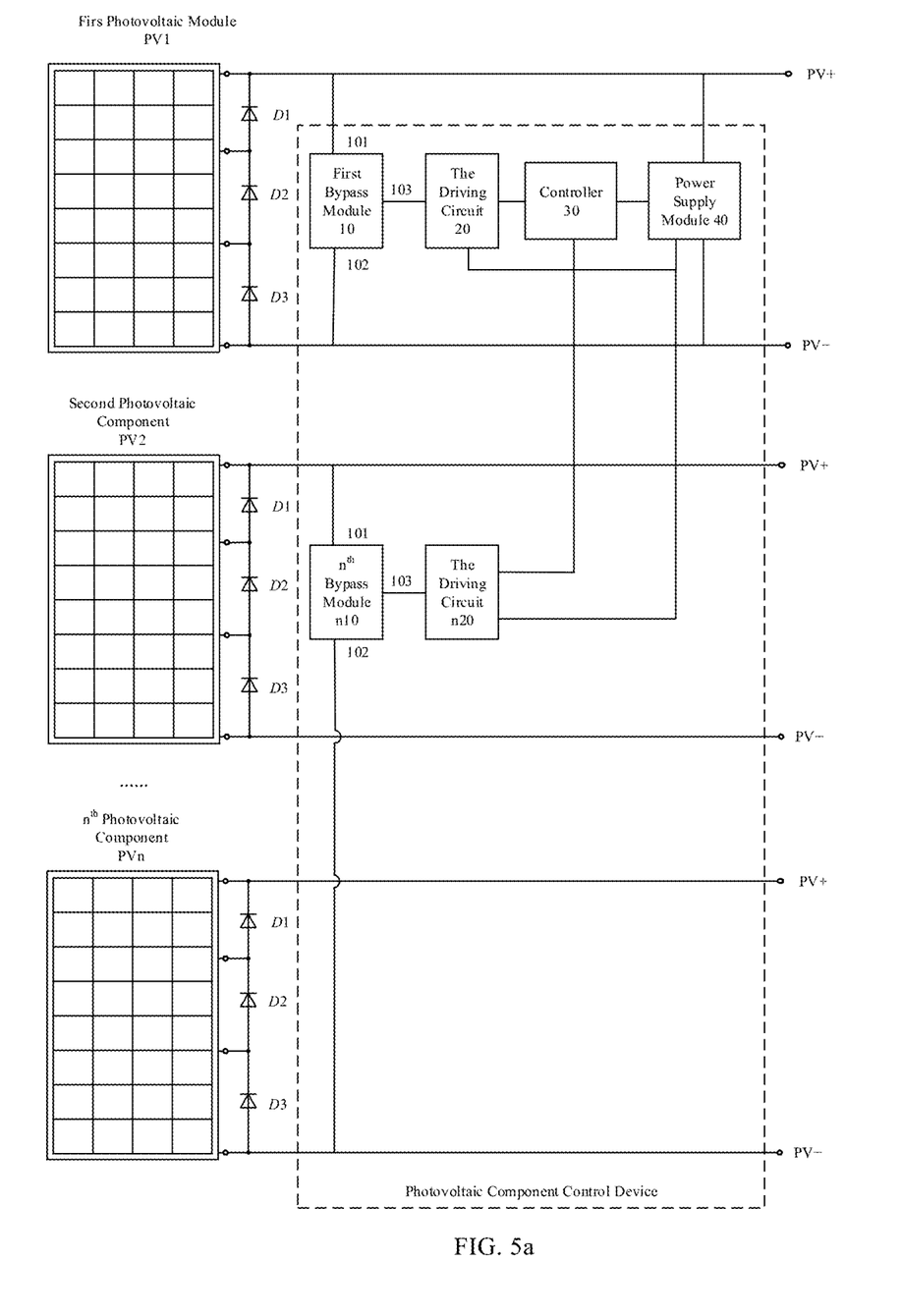
FIG. 5a is a third schematic diagram illustrating a photovoltaic component control device provided in an embodiment of the present disclosure.
Figure 5B:
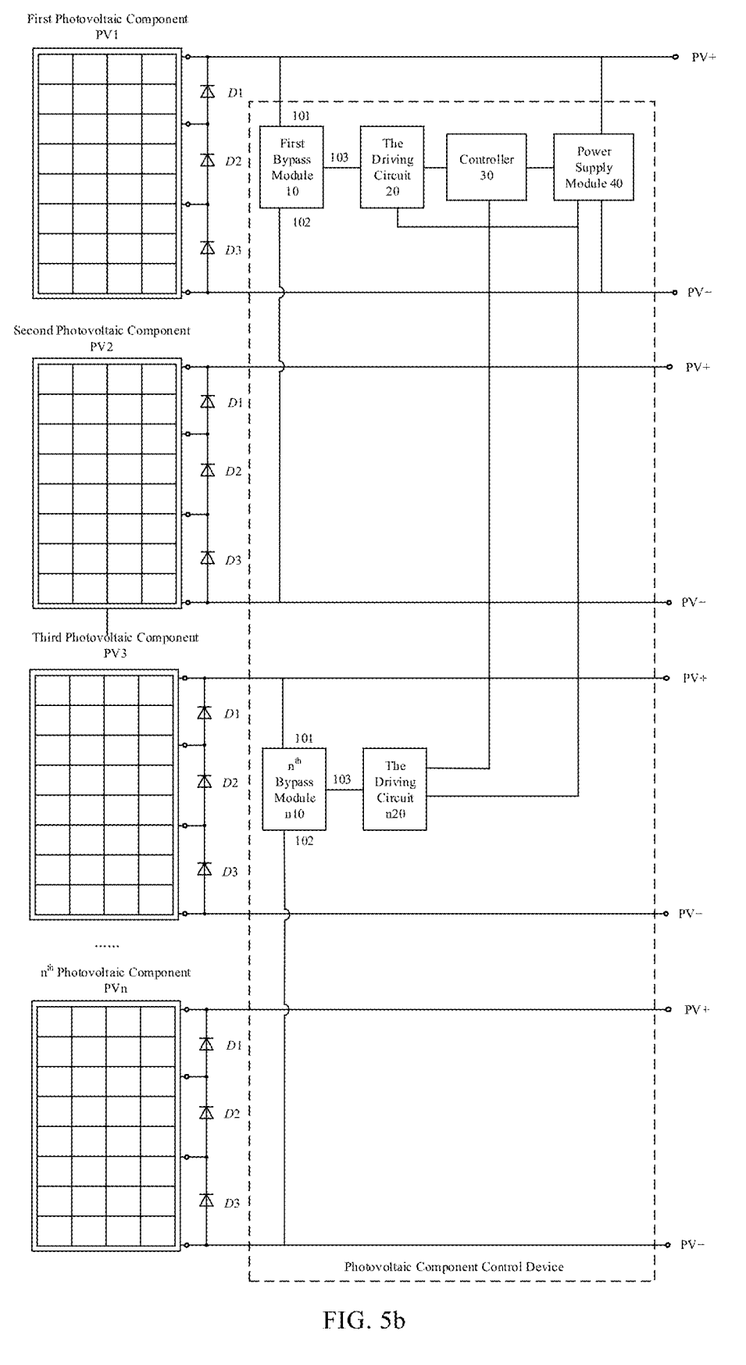
FIG. 5b is a fourth schematic diagram illustrating a photovoltaic component control device provided in an embodiment of the present disclosure.

Optionally, a bypass module may be connected in parallel to more than two photovoltaic components, and more than two photovoltaic components can be turned off at the same time, thereby realizing the rapidly turning off a plurality of components. Referring to FIG. 5a, the first bypass module 10 is connected in parallel to the first photovoltaic component PV1, and the $n^{th}$ bypass module n10 is connected in parallel to more than two photovoltaic components. Alternatively, as shown in FIG. 5b, the first bypass module 10 may be connected in parallel to more than two photovoltaic components, and the $n^{th}$ bypass module n10 may be also connected in parallel to more than two photovoltaic components. In this embodiment, the power supply module 40 may obtain energy from a certain photovoltaic component and provide the energy to the controller 30 and other modules. The controller 30 can control the bypass protection mechanism of the plurality of photovoltaic components, thereby reducing cost.

The control device in the embodiment of the present disclosure may be a pure bypass-type control device, and in a bypass module connected in parallel to the photovoltaic component, a switch device may be not disposed between the voltage input end 101 and the positive electrode of the photovoltaic component, and between the voltage output end 102 and the negative electrode of the photovoltaic component.

An operation process of the photovoltaic component control device in the embodiment of the present disclosure is as follows:

In the case that the photovoltaic component operates normally, the controller 30 may control at least one bypass module to be disconnected, and the photovoltaic component may output energy to outside. The power supply module 40 may obtain the energy from the photovoltaic component and supply the energy to the controller.

When the photovoltaic component needs to be turned off, the controller 30 may control at least one bypass module to be turned on. The photovoltaic component connected in parallel to the at least one bypass module may be protected by a bypass short circuit. The photovoltaic component may form a discharge circuit with the at least one bypass module, but not output energy to outside. The photovoltaic component has no safety hazard caused by turning on in series connection and meets the safety rules, thereby ensuring the power safety of the photovoltaic system. The power supply module 40 may obtain energy from the bypassed photovoltaic component and continuously supply the energy to the controller 30 and the driving circuit 20.

The pure bypass-type control device is adopted in the embodiment of the present disclosure, that is, the bypass module is directly connected in parallel with the photovoltaic component and no switch device is connected in series between the photovoltaic component and the bypass module, thus completely avoiding energy consumption generated by the constant ON of a series-type switch transistor in a series-type turn-off device, reducing the power consumption, and improving the output power of the photovoltaic array. The problem of voltage stress on the first series-type switch transistor in the series-type turn-off device when it is disconnected is solved, and the safety performance is improved. The elimination of the series-type switch transistor may simplify the circuit structure of the control device, reduce the complex turn-off logic and timing control requirement, improve the reliability of the control device, and reduce the cost. By directly connecting the bypass module and the photovoltaic component in parallel, a failure component can be cut out independently without affecting the normal operation of the component system, thereby achieving the bypass protection of a single component.

The bypass-type rapid control device for the photovoltaic component in the embodiment of the present disclosure can be applied to photovoltaic arrays with different sizes. The bypass protection mechanism can eliminate keeping-on restriction between series-connected photovoltaic components and can maximize the power generation of the photovoltaic arrays.

The power supply module provided in the embodiment of the present disclosure can directly obtain energy from the photovoltaic component under the normal operation state and the bypass state, thereby ensuring the reliability of the power supply of the control device, improving the reliability of the control device and the efficiency of the photovoltaic component system, and reducing cost.

Figure 6:
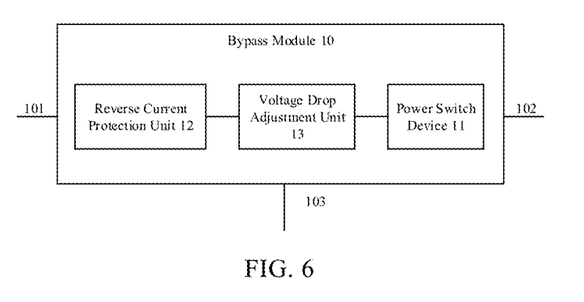
FIG. 6 is a first schematic diagram illustrating a bypass module provided in an embodiment of the present disclosure.

In a possible implementation, referring to FIG. 6, at least one bypass module 10 may include a power switch device 11, a reverse current protection unit 12, and a voltage drop adjustment unit 13. Input and output ends of the power switch device 11 may be connected to positive and negative electrodes of a photovoltaic component, respectively. A control end 103 of the power switch device 11 may be configured to receive a driving signal of the driving circuit 20. The driving circuit 20 may be controlled by the controller 30. The power switch device 11 bypasses the photovoltaic component under the control of the controller 30. The reverse current protection unit 12 may be configured to prevent the power switch device 11 from being damaged by reverse current. The voltage drop adjustment unit 13 may be configured to adjust a voltage drop between the input end and the output end of the bypass module in which it is located to a predetermined value in the case that the power switch device 11 is in an operation state (ON). In the case that the photovoltaic component is bypassed and the bypass module is in the operation state, the voltage drop adjustment unit 13 may provide operating voltage to the power supply module 40 to ensure the normal operation thereof.

Figure 7:
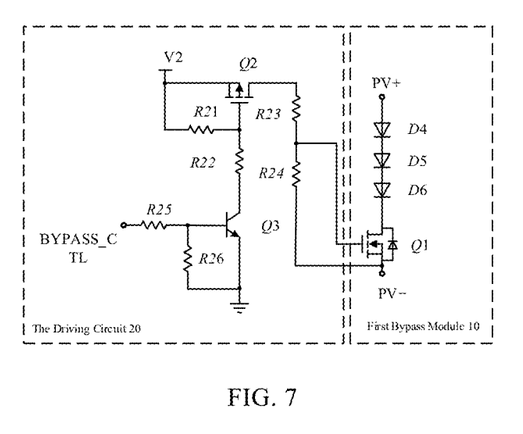
FIG. 7 is a schematic diagram illustrating a bypass module and a driving circuit provided in an embodiment of the present disclosure.

In a possible implementation, the first bypass module 10 may include a first MOS transistor Q1 and at least one diode connected in series with Q1. FIG. 7 illustrates a case that three series-connected diodes D4, D5, and D6 are adopted. The NMOS transistor Q1 may be served as the power switch device 11. The three series-connected diodes D4, D5, and D6 may be served as the reverse current protection unit 12 and the voltage drop adjustment unit 13 at the same time.

Positive and negative output ends of the photovoltaic component may be connected to the bypass module. An end of the positive electrode PV+ of the photovoltaic component may be connected to the three series-connected diodes D4, D5, and D6, and then connected in series to the power switch transistor Q1. The switch transistor may be connected to an end of the component to form a controllable unidirectional bypass short-circuit protection circuit. An anode of D4 may be connected to the positive electrode PV+ of the photovoltaic component, a cathode of D4 may be connected to an anode of D5, and a cathode of D5 may be connected to an anode of D6. A cathode of D6 may be connected to a drain of Q1. A source of Q1 may be connected to a negative electrode PV− of the photovoltaic component. A gate of Q1 may be connected to a driving signal output end of the driving circuit 20.

Taking FIGS. 5a and 5b as examples, when a first photovoltaic component PV1 connected in parallel to the first bypass module 10 is connected in series to other photovoltaic components, if PV1 is short-circuited by the first bypass module 10, the current output by the other photovoltaic components will flow through the first bypass module 10 in a reverse direction and cause damage to a body diode of Q1. By connecting diodes in series, it is possible to prevent reverse current from passing through the body diode of the MOS transistor and causing the failure of an original protection diode. In addition, the diodes connected in series may include the voltage drop adjustment unit 13, and provide operating voltage for the power supply module 40 to ensure the normal operation thereof in the case that the first bypass module 10 is operating. The number of the at least one diode is not limited to three, and can be determined according to the reverse current it can withstand and the operating voltage required by the power supply module 40. Optionally, the at least one diode may cause a voltage drop of more than 0.9V between the input end 101 and the output end 102 of the first bypass module 10.

In an embodiment shown in FIG. 7, the power switch device 11 can also be replaced by another power switch device, such as a relay, an IGBT, etc. Q1 is not limited to the NMOS transistor shown in FIG. 7, but can also be a PMOS transistor. The voltage drop adjustment unit 13 may also be a resistor, which may be connected in series to the at least one diode (not shown in the figure).

As shown in FIG. 7, the driving circuit 20 may include a second MOS transistor Q2 and a third triode Q3. Optionally, Q2 may be a P-channel MOS transistor, and Q3 may be an N-type triode. A source of Q2 may be connected to a second voltage input end V2. A first resistor R21 may be connected between a gate and the source of Q2. The gate of Q2 may be connected to a base of Q3 through a second resistor R22. R21 and R22 are voltage dividing resistors. A drain of Q2 may be connected to a negative electrode of the photovoltaic component through the third resistor R23 and the fourth resistor R24. The drain of Q2 may be connected to the gate of Q1 through the third resistor R23. R18 represents a driving signal input resistor of the first bypass module 10. R23 represents the base of Q3 and may receive the control signal BYPASS_CTL of the controller 30 through a fifth resistor R25. A sixth resistor R26 may be connected between the base and an emitter of Q3. R24 and R26 represent charge and discharge resistors. The emitter of Q3 must be connected to the ground.

The driving circuit 20 may obtain the second voltage V2 from the power supply module, for example, the voltage of 5V provides conduction voltage to Q1. The controller 30 may output the control signal BYPASS_CTL to control Q3 to be turned on or off. When BYPASS_CTL is at a high potential, Q3 is turned on, a potential between R21 and R22 is lower than 5V, Q2 is turned on, R23 and R34 generate a high potential, Q1 is turned on, and the first bypass module 10 is turned on. When BYPASS_CTL is at a low potential, Q3 is cut off, the potential between R21 and R22 is equal to 5V, Q2 is cut off, R23 and R24 are at a low potential, Q1 is cut off, and the bypass module must be disconnected.

Figure 8:
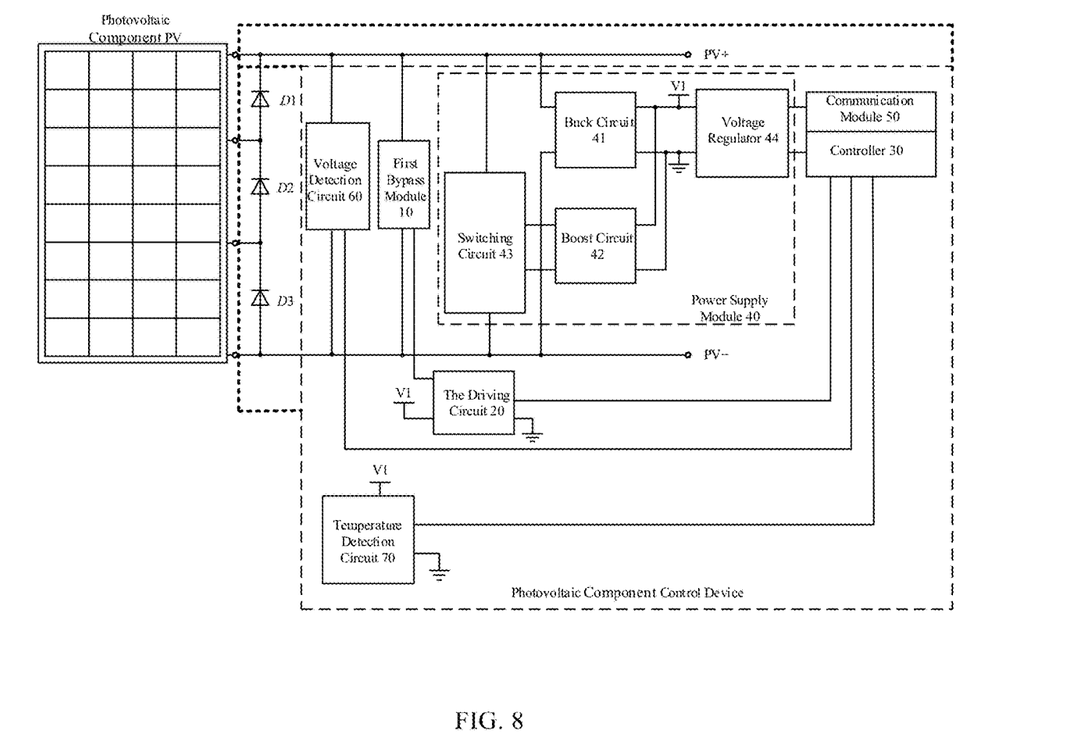
FIG. 8 is a sixth schematic diagram illustrating a photovoltaic component control device provided in an embodiment of the present disclosure.

Referring to FIG. 8, in a possible implementation, the power supply module 40 may include a buck circuit 41 configured to convert a voltage output by at least one photovoltaic component to a second operating voltage in the case that at least one photovoltaic component operates normally; a boost circuit 42 configured to convert a voltage between the input end and the output end of the at least one bypass module into a first operating voltage in the case that at least one photovoltaic component is bypassed; a switching circuit 43 configured to compare the second operating voltage with a reference voltage, and control whether the boost circuit and at least one bypass module are turned on according to a comparison result. Optionally, the reference voltage may be the control voltage BYPASS_CTL output by the controller 30.

Figure 9:
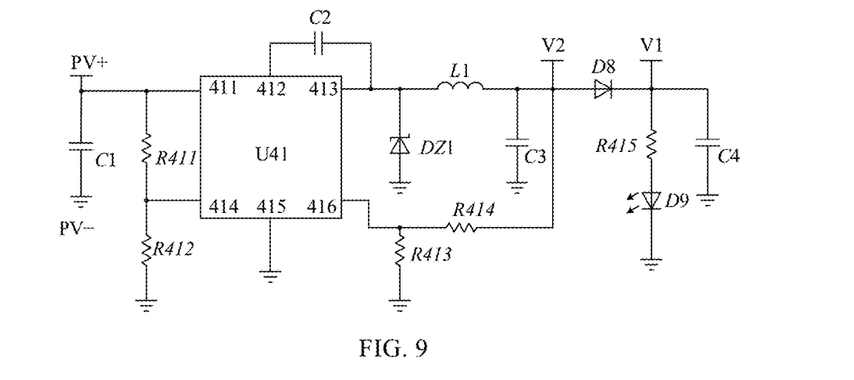
FIG. 9 is a schematic diagram of a buck circuit provided by an embodiment of the present disclosure.

FIG. 9 illustrates a possible implementation of the buck circuit 41. The buck circuit 41 may include a first integrated chip U1 including six pins 411 to 416. The pin 411 may be connected to a positive electrode PV+ of the photovoltaic component and served as a voltage input end. The pin 411 may be connected to a negative electrode PV− of the photovoltaic component through a first capacitor C1, where, C1 represents an input stabilizing capacitor, which may play the role of filtering and stabilizing. A seventh resistor R411 and an eighth resistor R412 may be connected in series between the pin 411 and the ground. The pin 414 may be connected between R411 and R412. R411 and R412 may be voltage dividing resistors connected in series and configured to provide enable signals for an end of the pin 414 to control the operation status of the chip. When the enable signal is at a high potential, the chip operates. When the enable signal is at a low potential, the chip does not operate. The pin 415 may be connected to PV−. A second capacitor C2 may be connected in series between pins 412 and 413, which may be served as a bootstrap capacitor to provide driving voltage for a power switch transistor in the chip. The pin 413 may be a voltage output end of U1, and a first stabilizing diode DZ1 may be connected between the pin 413 and the ground to stabilize the voltage of an output end. The pin 413 may be connected to the ground through the first inductor L1 and the third capacitor C3 which are connected in series. The first inductor L1 and the third capacitor C3 may form an LC filter structure to filter out a high-frequency harmonics and stabilize the output DC voltage (a second voltage V2). An output end of the second voltage V2 may be connected to the ground through series-connected ninth resistor R414 and tenth resistor R413. The pin 416 may be connected between R414 and R413 and used to sample the output voltage V2 and form a feedback signal to the chip U1.

To stabilize the voltage V2 output from the buck circuit 41, the output end of the second voltage V2 may be connected to an eighth diode D8 to form a unidirectional charging clamping stabilizing circuit to obtain a stabilized first voltage V1. V1 may form a unidirectional discharge circuit with a light-emitting diode D9 through a series-connected eleventh resistor R415 to prevent the output power supply from over-voltage. If D9 emits light, V1 may have a certain amount of power. A fourth capacitor C4 may also be connected between V1 and the ground to filter and stabilize the first voltage V1.

Figure 10:
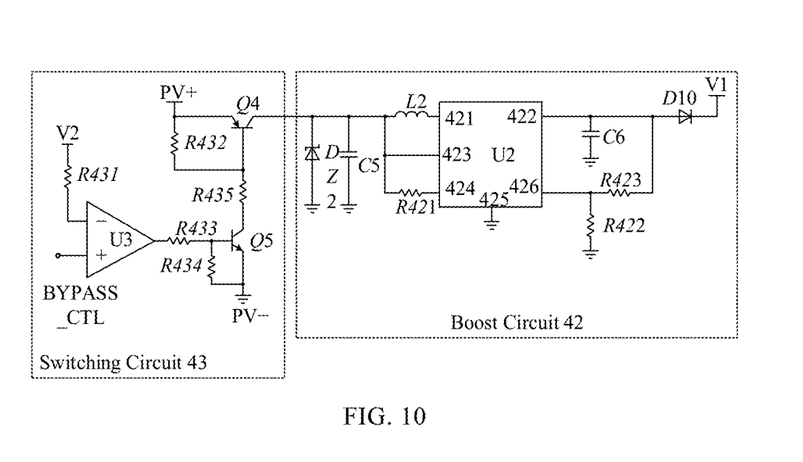
FIG. 10 is a schematic diagram illustrating a boost circuit and a switching circuit provided by an embodiment of the present disclosure.

FIG. 10 illustrates a possible implementation of the boost circuit 42. The boost circuit 42 may include a second integrated chip U2 including six pins 421 to 426, wherein the pin 423 represents a voltage input end of U2. The pin 421 may be connected to the pin 423 through a second inductor. L2 represents a boost inductor and may be configured to store energy and boost voltage. The pin 423 may be also connected to the ground through a second stabilizing diode DZ2 and a fifth capacitor C5 that are connected in parallel. C5 represents a stabilizing capacitor. The pin 424 represents an enable end of U2. The pin 424 may be connected to the voltage input end 423 through a twelfth resistor R421. R421 represents an enable input resistor, which may control an input size of the enable signal. The pin 425 may be connected to the ground. The pin 422 may be a voltage output end and connected to the ground through a sixth capacitor C6. C6 may be used to filter out an interference waveform and stabilize DC output. The pin 422 may be also connected to the ground through series-connected fourteenth resistor R423 and thirteenth resistor R422. The pin 426 may be connected between R423 and R422, and used to sample an output voltage and form a feedback signal to the chip U2. To stabilize the first voltage V1 output by the boost circuit 42, the voltage output pin 422 of U2 may be connected to a twelfth transistor D10 to obtain the stable first voltage V1.

In a possible implementation, the switching circuit 43 may include a comparator and at least one switch transistor. A first signal input end of the comparator may be configured to receive a second operating voltage output by the buck circuit, and a second signal input end of the comparator may be configured to receive a reference signal. Input and output ends of at least one switch transistor may be connected to the boost circuit and the bypass module. A control end of at least one switch transistor may be connected to a signal output end of the comparator. At least one switch transistor may control turning on the boost circuit and the bypass module according to an output signal of the comparator. Since the bypass module and the photovoltaic component are connected in parallel, "turning on the boost circuit and the bypass module" means turning on the boost circuit and the photovoltaic component. Referring to FIGS. 8 and 10, the switching circuit 43 includes a comparator U3 and a fourth triode Q4. A first signal input end of U3 may be used to receive a second operating voltage V2 output by the buck circuit U1. A second signal input end of U3 may be used to receive a reference voltage signal. Optionally, the reference voltage signal may be a control signal BYPASS_CTL output by the controller 30. The fourth triode Q4 may be connected to the boost circuit 42 and the first bypass module 10. A signal output end of the comparator U3 may be used to control whether Q4 is turned on or not, thereby controlling whether the boost circuit 42 and the first bypass module 10 are turned on or not. In FIG. 10, an emitter of Q4 is connected to a positive electrode PV+ of the photovoltaic component, and a potential of PV+ is the same as that of an input end 101 of the first bypass module 10, thus the emitter of Q4 is connected to the first bypass module 10 at the same time.

The switching circuit 43 may also include a fifth triode Q5. U3 may be a constant current comparator. An inverting input end of U3 may be connected to the second voltage V2 through a fifteenth resistor R431. R431 may be an input resistor and control the reference of input current. The output end of U3 may be connected to a base of Q5 through a sixteenth resistor R433. The output end of U3 may be connected to the ground through the series-connected sixteenth resistor R433 and seventeenth resistor R434. R434 may be a charge and discharge resistor and connected in series between the base and an emitter of the triode Q5. An eighteenth resistor R432 and a nineteenth resistor R435 may be connected in series between the positive electrode of the photovoltaic component and a collector of Q5. R432 and R435 may be voltage dividing resistors. The R432 may be connected between a collector and a base of Q4. R435 may be connected between the base of Q4 and the collector of Q5. Optionally, Q4 may be a P-channel triode, and Q5 may be an N-channel triode. The collector of Q4 may be served as a voltage output end of the switching circuit 43 and connected to the voltage input end 423 of U2.

The operation principle of the power supply module 40 is as follows: the power supply module includes two power-taking states: a normal operation state and a bypass turning-on state of the photovoltaic component. When the bypass module is disconnected, the photovoltaic component operates normally and output power to outside. The output voltage of the photovoltaic component is, for example, 17~60V. At this time, the buck circuit 41 operates to reduce the voltage output by the photovoltaic component and convert it into the second voltage V2. After the buck is further performed internally, the first voltage V1 is output, and power supply is stably provided to the controller 30. When the first bypass module 10 is turned on, the first bypass module 10 forms a unidirectional turn-on bypass through the reverse current protection unit 12, and forms a predetermined voltage drop through the voltage drop adjustment unit to ensure that the boost circuit operates normally. At this time, the boost circuit 42 converts the voltages at input and output ends of the first bypass module 10 into the first voltage V1 and stably provides power supply to the controller 30. In order to prevent the input of the switching circuit 43 from exceeding an allowable range, the switching circuit 43 compares whether the voltage output by the buck circuit reaches the allowable range. When the voltage output by the buck circuit reaches the allowable range, for example, less than 3.3V, the boost circuit 42 and the bypass module 41 are conducted. Since the photovoltaic component is bypassed by the bypass module 41, the voltage output by the photovoltaic component is a voltage between the input and output ends of the bypass module 41. The boost circuit 42 boosts the voltage to obtain a stable first voltage.

The power supply module of the present disclosure realizes DC power-taking at bypass low-voltage, solves the problem of DC power-taking at low-voltage in the bypass mode, provides a stable auxiliary power supply for the control device, ensures the stable operation of the photovoltaic array, and ensures the photovoltaic system safe and efficient.

Figure 11:
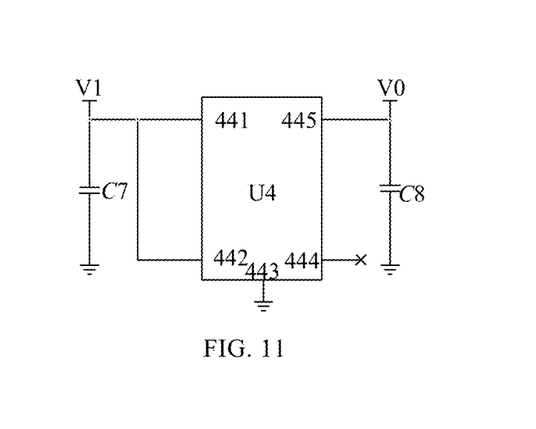
FIG. 11 illustrates a voltage regulator provided in an embodiment of the present disclosure.

Referring to FIGS. 8 and 10, in a possible implementation of the present disclosure, the power supply module 40 may further include a voltage regulator 44 which may include a fourth chip U4 configured to realize DC voltage conversion and convert the first voltage V1 into voltage V0 required by the controller. V0 may be, for example, 3V. U4 may include pins 441 to 445. Optionally, U4 may be a linear stabilizing chip. The pin 441 may be a voltage input end and configured to receive the first voltage V1. The pin 441 may be connected to the ground through a seventh capacitor C7. C3 may be an input filter capacitor and used to stabilize an input of the power supply. The pin 442 may be an enable end and connected to the pin 441 to receive the first voltage V1. The pin 443 may be connected to the ground. The pin 445 may be a voltage output end and connected to the ground through an eighth capacitor C8. C8 may be used to stabilize an output of the DC power supply.

In a possible implementation of the present disclosure, the controller may also include a voltage detection circuit 60 and a temperature detection circuit 70, which may be configured to monitor operation status of the photovoltaic component. The voltage detection circuit 60 may be configured to obtain a voltage output by at least one photovoltaic component. The temperature detection circuit 70 may be configured to obtain temperature of at least one photovoltaic component. When the photovoltaic component generates power, illumination and panel temperature will affect panel current. Within a certain range, the stronger the illumination is, the greater the output current is, and the higher the temperature is, the smaller the output voltage is. When the photovoltaic component fails, photovoltaic curve voltage may be very small. The voltage detection circuit 60 can be used to determine whether a failure occurs and send a detection signal to the controller 30. If the failure occurs, the controller 30 may control the bypass module to turn on unidirectionally, thereby protecting the photovoltaic component and stabilizing the component system. By using the voltage detection circuit 60 and the temperature detection circuit 70, the monitoring of a single component can be realized, and the protection of photovoltaic components can be more accurate.

Optionally, the photovoltaic component control device may also include a communication module 50 configured to receive a control signal and transmit the control signal to the controller 30. Optionally, the communication module and a control module of the controller may be packaged in one chip. When it is necessary to actively turn off the photovoltaic component, for example, on a special occasion such as a house fire, the controller 30 may receive a remote-control signal through the communication module 50 and control the driving circuit 20 to turn on the first bypass module 10 to realize the bypass short circuit protection of the photovoltaic component. Optionally, the communication module 50 may include a short-distance communication module or a remote communication module. The short-distance communication module may include a Bluetooth module, a WIFI module, a ZigBee module, an Ethernet module, a serial port module, a parallel port module, etc. The remote communication module may include a GPRS module, a 2G module, a 3G module, a 4G module, a 5G module, an LTE module, etc.

Optionally, as shown in FIG. 8, the photovoltaic component control device and bypass diodes (D1, D2, and D3) of cells of the photovoltaic component are packaged together with each other, for example, disposed in the same junction box.

Optionally, the power supply module 40 may also supply energy to the communication module 50, the voltage detection circuit 60, and the temperature detection circuit 70.

Figure 12:
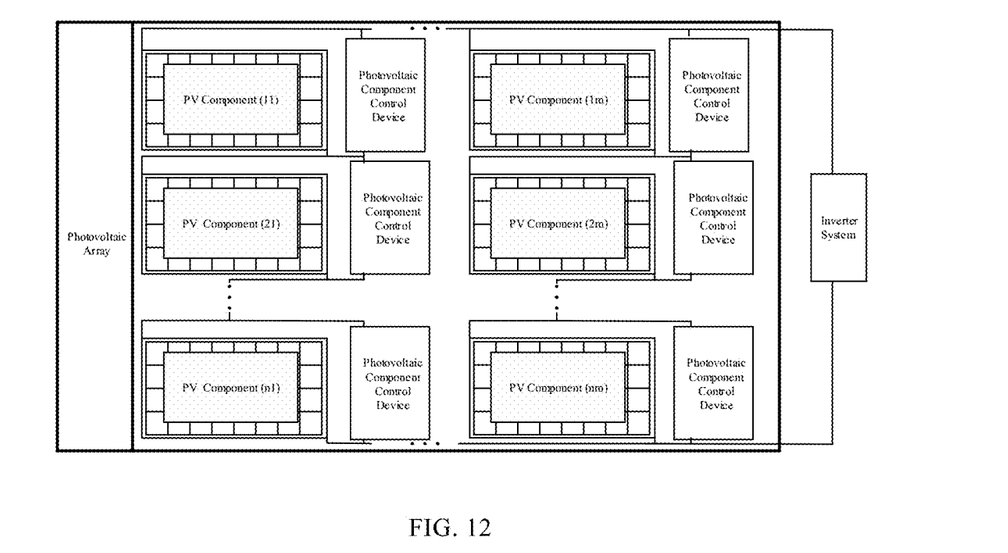
FIG. 12 is a schematic diagram illustrating a single-control type photovoltaic component control device provided in an embodiment of the present disclosure.

FIG. 12 illustrates a photovoltaic array using a single-control type photovoltaic component control device. The photovoltaic array may be composed of a plurality of photovoltaic components connected in series and parallel. According to a coordinate arrangement, positions and marks of n×m components can be obtained. Each photovoltaic component may be connected to the bypass-type rapid control device. When an accident of the photovoltaic component occurs, a bypass module connected in parallel to the photovoltaic component can be rapidly turned on to protect the component from a short circuit and ensure the safety of the power system. The single-control type photovoltaic component control device can realize the status monitoring of a single component.

Figure 13:
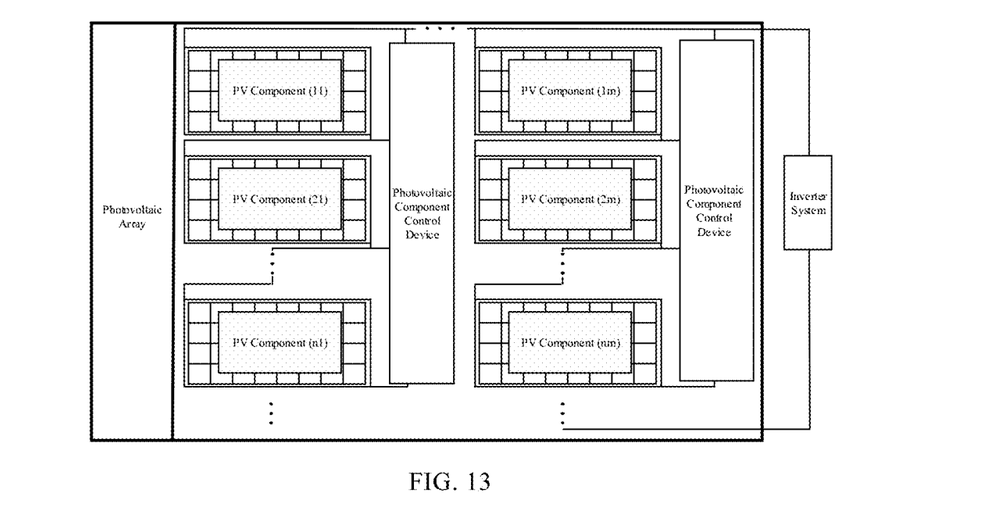
FIG. 13 is a schematic diagram illustrating a multi-control type photovoltaic component control device.

FIG. 13 illustrates a photovoltaic array using a multi-control type photovoltaic component control device. The photovoltaic array may obtain power from a single photovoltaic component using a bypass-type rapid turn-off device multi-component and supply the power to the controller 30 and other components. The controller 30 can realize the bypass protection mechanism of a plurality of photovoltaic components, thereby reducing cost.

Various technical features of the above embodiments can be combined arbitrarily. To simplify the description, not all possible combinations of the technical features in the above-described embodiments are described. However, as long as there is no conflict in the combination of these technical features, all combinations should be considered to be within the scope of the description.

The above-described embodiments only express several implementations of the present disclosure, the descriptions are relatively specific and detailed, and should not be construed as limiting the scope of the present disclosure. It should be noted that, for those skilled in the art, several variations and modifications can be made without departing from the concept of the present disclosure, all of which fall within the protection scope of the present disclosure. Therefore, the protection scope is accorded with the appended claims.

The invention claimed is:

1. A photovoltaic component control device, comprising at least one bypass module, a driving circuit, a power supply module, and a controller, wherein
   the at least one bypass module is configured to connect in parallel to at least one photovoltaic component,
   the power supply module is configured to connect to the at least one photovoltaic component and the at least one bypass module,
   the at least one bypass module is configured to bypass the at least one photovoltaic component under control of the controller,
   the driving circuit is configured to drive the at least one bypass module to operate under the control of the controller,
   the power module is configured to obtain energy from the at least one photovoltaic component and output the energy to the controller and the driving circuit in a case that the at least one photovoltaic component operates normally and the at least one photovoltaic component is bypassed, and
   the controller is configured to control an ON state of the at least one bypass module to control whether the at least one photovoltaic component is in a bypass mode, and
   wherein the power supply module comprises a buck circuit configured to, in a case that the at least one photovoltaic component operates normally, convert a voltage output by the at least one photovoltaic component to a second operating voltage.

2. The photovoltaic component control device of claim 1, wherein
   the at least one bypass module comprises a power switch device,
   an input end and an output end of the power switch device are respectively connected to a positive electrode and a negative electrode of the at least one photovoltaic component, and
   a control end of the power switch device is configured to receive a driving signal of the driving circuit.

3. The photovoltaic component control device of claim 2, wherein the at least one bypass module comprises:
   a reverse current protection unit connected in series to the power switch device and configured to prevent the power switch device from being damaged by reverse current.

4. The photovoltaic component control device of claim 2, wherein the at least one bypass module comprises a voltage drop adjustment unit configured to, in a case that the power switch device is in an operation state, adjust a voltage drop between an input end and an output end of the at least one bypass module to a predetermined value.

5. The photovoltaic component control device of claim 2, wherein the at least one bypass module comprises at least one diode, and the at least one diode is connected in series to the power switch device.

6. The photovoltaic component control device of claim 4, wherein the power supply module comprises a boost circuit configured to, in a case that the at least one photovoltaic component is bypassed, convert a voltage between the input end and the output end of the at least one bypass module to a first operating voltage.

7. The photovoltaic component control device of claim 6, wherein the power supply module comprises a switching circuit configured to compare the second operating voltage with a reference voltage, and control whether the boost circuit and the at least one bypass module are turned on or off according to a comparison result.

8. The photovoltaic component control device of claim 7, wherein
   the switching circuit comprises a comparator and at least one switch transistor,
   a first signal input end of the comparator is configured to receive the second operating voltage output by the buck circuit, and a second signal input end of the comparator is configured to receive a reference signal,
   an input end and an output end of the at least one switch transistor are connected to the boost circuit and the bypass module, and
   a control end of the at least one switch transistor is connected to a signal output end of the comparator.

9. The photovoltaic component control device of claim 8, wherein
   the at least one bypass module comprises two or more bypass modules connected in series, and the two or more bypass modules connected in series are configured to connect in parallel to the at least one photovoltaic component.

10. The photovoltaic component control device of claim 1,
    wherein the controller comprises a communication module, a voltage detection circuit, and/or a temperature detection circuit,
    the communication module is configured to receive a control signal and transmit the control signal to the controller,
    the voltage detection circuit is configured to obtain voltage output by the at least one photovoltaic component, and
    the temperature detection circuit is configured to obtain temperature of the at least one photovoltaic component.

* * * * *